(12) United States Patent
Sugizaki et al.

(10) Patent No.: US 10,118,475 B2
(45) Date of Patent: Nov. 6, 2018

(54) BATTERY UNIT AND VEHICLE

(71) Applicant: HONDA MOTOR CO., LTD., Tokyo (JP)

(72) Inventors: Tetsuya Sugizaki, Wako (JP); Rieko Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,232

(22) Filed: Mar. 16, 2017

(65) Prior Publication Data

US 2017/0267089 A1 Sep. 21, 2017

(30) Foreign Application Priority Data

Mar. 17, 2016 (JP) .................................. 2016-053286

(51) Int. Cl.
*B60K 1/04* (2006.01)
*H01M 2/10* (2006.01)

(52) U.S. Cl.
CPC ............. *B60K 1/04* (2013.01); *H01M 2/1077* (2013.01); *H01M 2/1083* (2013.01); *B60K 2001/0438* (2013.01); *H01M 2220/20* (2013.01)

(58) Field of Classification Search
CPC .................................................... B60R 16/04
See application file for complete search history.

(56) References Cited

U.S. PATENT DOCUMENTS

| 5,392,873 | A  | * | 2/1995  | Masuyama | ............. | B60R 16/04 180/68.5 |
| 7,051,825 | B2 | * | 5/2006  | Masui    | ...................... | B60K 1/04 180/65.1 |
| 9,242,539 | B2 | * | 1/2016  | Ling     | ........................ | B60K 1/04 |
| 9,758,029 | B2 | * | 9/2017  | Hokazono | ................ | B60K 1/04 |
| 9,761,851 | B2 | * | 9/2017  | Onodera  | ............. | H01M 2/1241 |
| 9,884,544 | B2 | * | 2/2018  | Berger   | ...................... | B60K 1/04 |
| 2004/0235315 | A1 | * | 11/2004 | Masui | ...................... | B60K 1/04 439/34 |
| 2008/0196957 | A1 | * | 8/2008  | Koike    | ...................... | B60K 1/04 180/68.5 |
| 2010/0273040 | A1 | * | 10/2010 | Kubota   | .................... | B60K 1/04 429/100 |
| 2010/0294580 | A1 | * | 11/2010 | Kubota   | .................... | B60K 1/04 180/68.1 |
| 2011/0011654 | A1 | * | 1/2011  | Kubota   | .................... | B60K 1/04 180/65.21 |

(Continued)

FOREIGN PATENT DOCUMENTS

JP         2004-345453         12/2004

*Primary Examiner* — James A Shriver, II
*Assistant Examiner* — Vaughn Coolman
(74) *Attorney, Agent, or Firm* — Mori & Ward, LLP

(57) ABSTRACT

A battery unit includes a battery module, an upper frame member, a battery case, a battery cover, a sealing member, and a sealing bolt. The battery module is suspended from the upper frame member. The battery case has an opening to accommodate the battery module in the battery case. The battery cover is to cover the opening of the battery case. The sealing member is to seal a gap between the battery case and the battery cover. The sealing bolt is provided on the battery cover and secured to the upper frame member to connect the battery module and the battery cover via the upper frame member.

8 Claims, 9 Drawing Sheets

(56) References Cited

U.S. PATENT DOCUMENTS

| | | | | |
|---|---|---|---|---|
| 2011/0222240 | A1* | 9/2011 | Kawata | B60L 3/00 |
| | | | | 361/690 |
| 2012/0121962 | A1* | 5/2012 | Katayama | B60K 1/04 |
| | | | | 429/120 |
| 2014/0166381 | A1* | 6/2014 | Ling | B60K 1/04 |
| | | | | 180/68.5 |
| 2014/0284125 | A1* | 9/2014 | Katayama | B60K 1/04 |
| | | | | 180/68.5 |
| 2015/0343971 | A1* | 12/2015 | Ikeda | B60K 1/04 |
| | | | | 429/100 |
| 2015/0357606 | A1* | 12/2015 | Nishimura | H01M 2/024 |
| | | | | 429/176 |
| 2016/0301120 | A1* | 10/2016 | Katsuno | H01M 10/663 |
| 2017/0174064 | A1* | 6/2017 | Shinoda | B60K 1/04 |

\* cited by examiner

BATTERY UNIT AND VEHICLE

CROSS-REFERENCE TO RELATED APPLICATIONS

The present application claims priority under 35 U.S.C. § 119 to Japanese Patent Application No. 2016-053286, filed Mar. 17, 2016, entitled "Battery Unit and Vehicle." The contents of this application are incorporated herein by reference in their entirety.

BACKGROUND

1. Field

The present disclosure relates to a battery unit and a vehicle.

2. Description of the Related Art

Hybrid vehicles, electric vehicles, and other vehicles powered by electric motors are typically mounted with a battery unit containing battery modules. Japanese Unexamined Patent Application Publication No. 2004-345453, for example, discloses a vehicle in which the battery unit is disposed under a seat.

The battery unit typically includes a battery case containing battery modules, a battery cover that covers the upper opening of the battery case, and a sealing member that seals a gap between the battery case and the battery cover.

Known examples include a battery unit in which the battery case contains battery modules that are suspended from and supported on an upper frame member.

SUMMARY

According to one aspect of the present invention, a battery unit includes a battery module, an upper frame member that holds the battery module in a suspended state, a battery case that contains the battery module held by the upper frame member, a battery cover that covers an upper opening of the battery case, and a sealing member that seals a gap between the battery case and the battery cover, in which the upper frame member is secured to the battery cover with a sealing bolt seated in the battery cover and thereby the battery module is held by the battery cover.

According to another aspect of the present invention, a battery unit includes a battery module, an upper frame member, a battery case, a battery cover, a sealing member, and a sealing bolt. The battery module is suspended from the upper frame member. The battery case has an opening to accommodate the battery module in the battery case. The battery cover is to cover the opening of the battery case. The sealing member is to seal a gap between the battery case and the battery cover. The sealing bolt is provided on the battery cover and secured to the upper frame member to connect the battery module and the battery cover via the upper frame member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
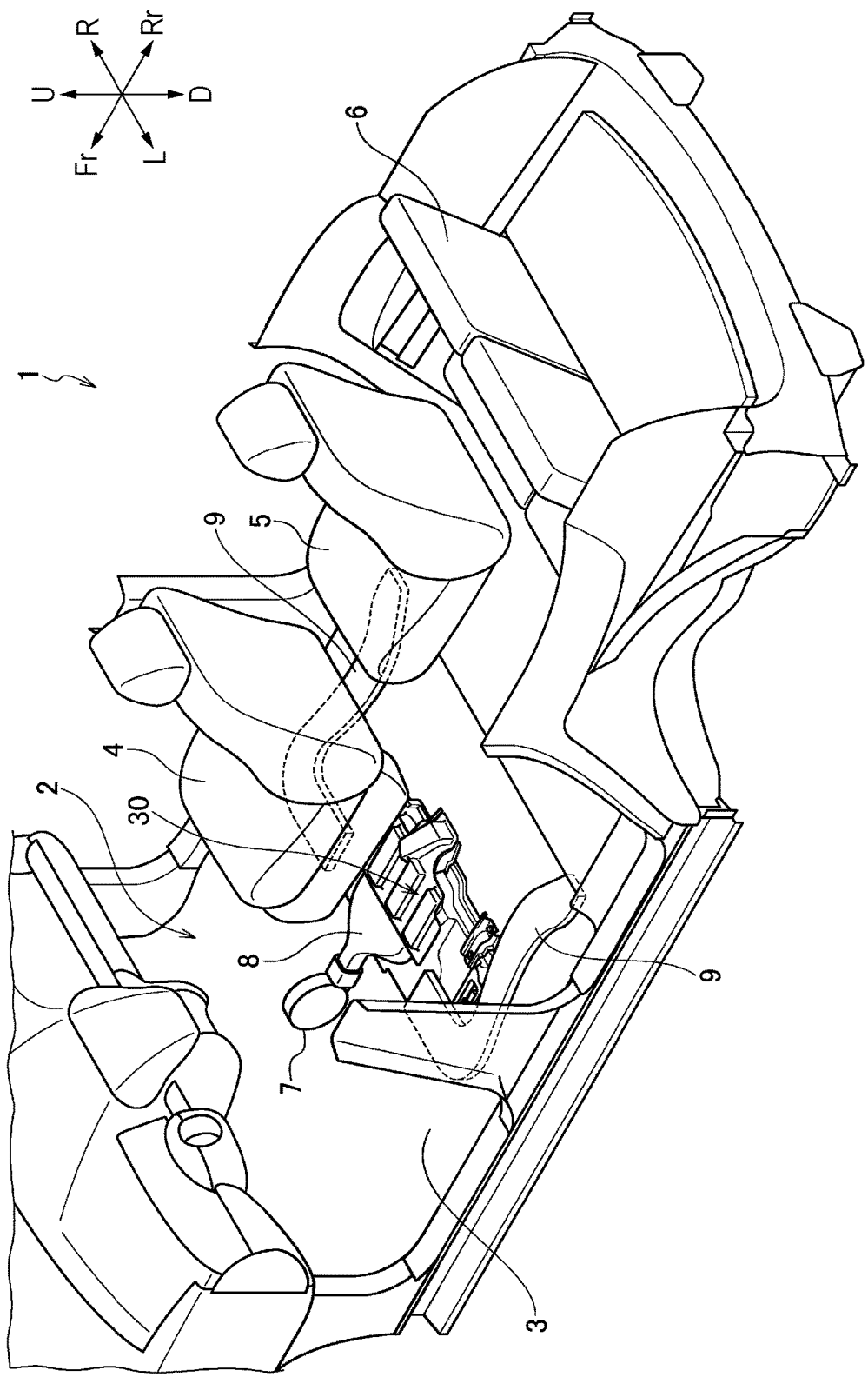
FIG. 1 is a perspective view showing major components disposed in a passenger compartment of a vehicle according to an embodiment of the present application, in which a left front seat and a left rear seat are omitted.

The embodiments will now be described with reference to the accompanying drawings, wherein like reference numerals designate corresponding or identical elements throughout the various drawings.

An embodiment of the present application will be described below with reference to the attached drawings. Orientations of the drawings are relative to the orientations of reference numerals and symbols therein. In addition, in the following descriptions, reference to "vehicle front (Fr)", "vehicle rear (Rr)", "left (L)", "right (R)", "upside (U)", or "downside (D)" is relative to a driver's position.

As shown in FIG. 1, a vehicle 1 according to this embodiment is provided with left and right front seats 4, left and right rear seats 5, left and right foldable seats 6 in the third row, and a battery unit 30 that supplies electric power to motors and the like (not illustrated), all of which are disposed on a floor panel 3 constituting a floor of a passenger compartment 2.

Referring to FIGS. 6 through 9, the battery unit 30 is disposed in a battery storage recess 3a (see FIG. 8) in the floor panel 3 so as to be located below the front seats 4. The battery storage recess 3a is surrounded by a pair of left and right side frames 12 and a pair of front and rear cross members 13, 14 (hereinafter referred to as "front cross member 13" and "rear cross member 14", respectively).

Figure 2:
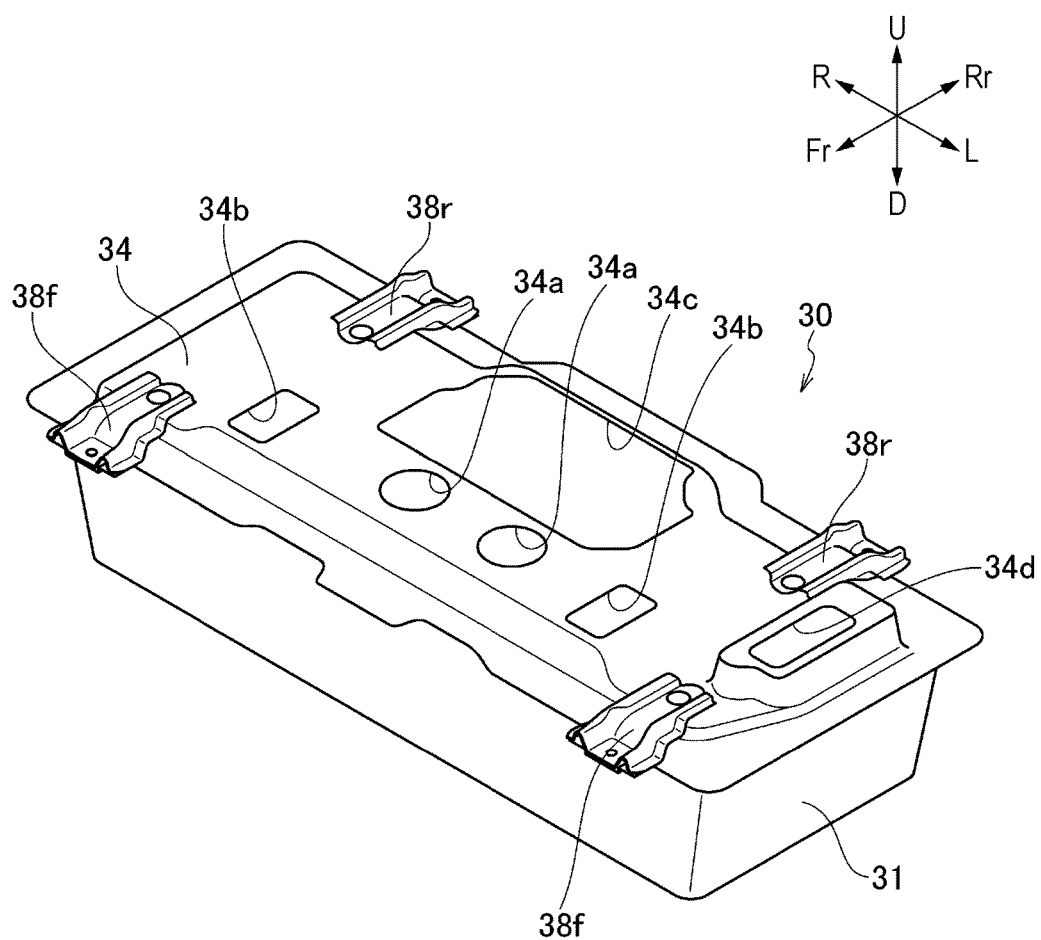
FIG. 2 is a perspective view of a battery unit according to an embodiment of the present application.
Figure 3:
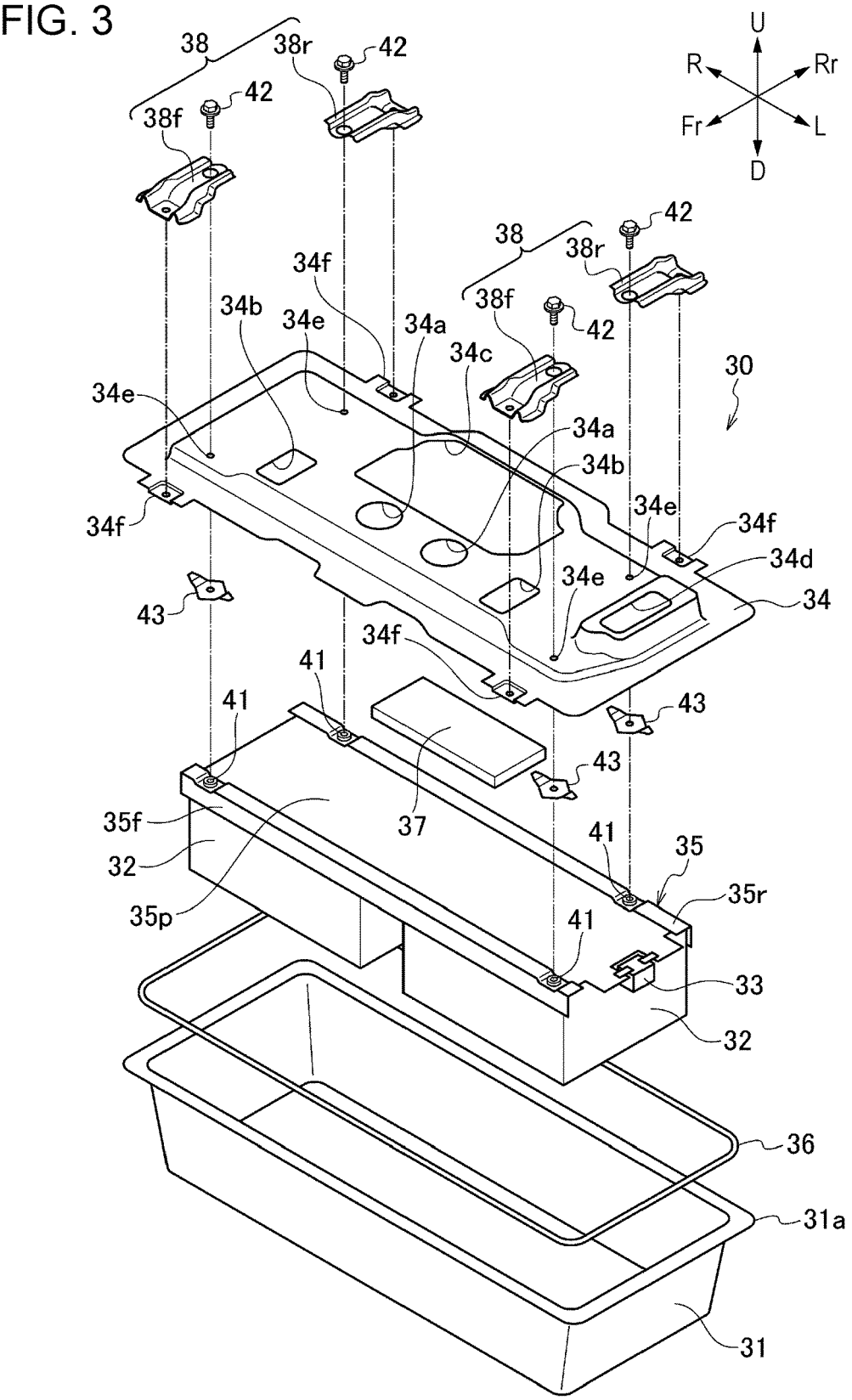
FIG. 3 is an exploded perspective view of a battery unit according to an embodiment of the present application.

As shown in FIGS. 2 and 3, the battery unit 30 is provided with a battery case 31 formed in the shape of a rectangular parallelepiped with its longer side extending in the vehicle-width direction when seen in plan view, battery modules 32 that are contained in the battery case 31, a battery ECU 37, an inspection and servicing plug 33, a battery cooling duct (not illustrated), and a battery cover 34 that covers an upper opening (an opening) of the battery case 31.

The battery unit 30 according to this embodiment contains the two battery modules 32 that are arranged side by side in the vehicle-width direction and that are coupled to each other in an integral manner with an upper frame member 35 having a relatively high rigidity therebetween. In other words, the upper frame member 35 holds the left and right battery modules 32 in the suspended state. The upper frame member 35 includes a pair of front and rear cross frames 35f, 35r having a substantially L-shaped cross section and a rectangular-shaped upper panel 35p that covers an upper surface of the two battery modules 32, and the cross frame 35f is secured to a front end of the upper panel 35p and the cross frame 35r is secured to a rear end of the upper panel 35p, thereby forming a partially closed section. The battery modules 32 generate via the battery ECU 37 that controls the charging/discharging thereof electric output by the battery unit 30.

The inspection and servicing plug 33 is an operation tool that is used to shut off an electric output from the battery modules 32 during inspection or servicing of the vehicle 1 and that is disposed on the left side in the vehicle-width direction of the battery case 31 so as to allow access for operation from outside the battery unit 30 through a plug access hole 34d of the battery cover 34.

The battery cooling duct is configured to cool the battery modules 32 with air (for example, cooled air from an air conditioning apparatus) introduced from a cooling fan 7 shown in FIG. 1 into the battery unit 30 through an intake duct 8. After cooling the battery modules 32, the air is discharged to the passenger compartment 2 through an exhaust duct 9.

Figure 4:
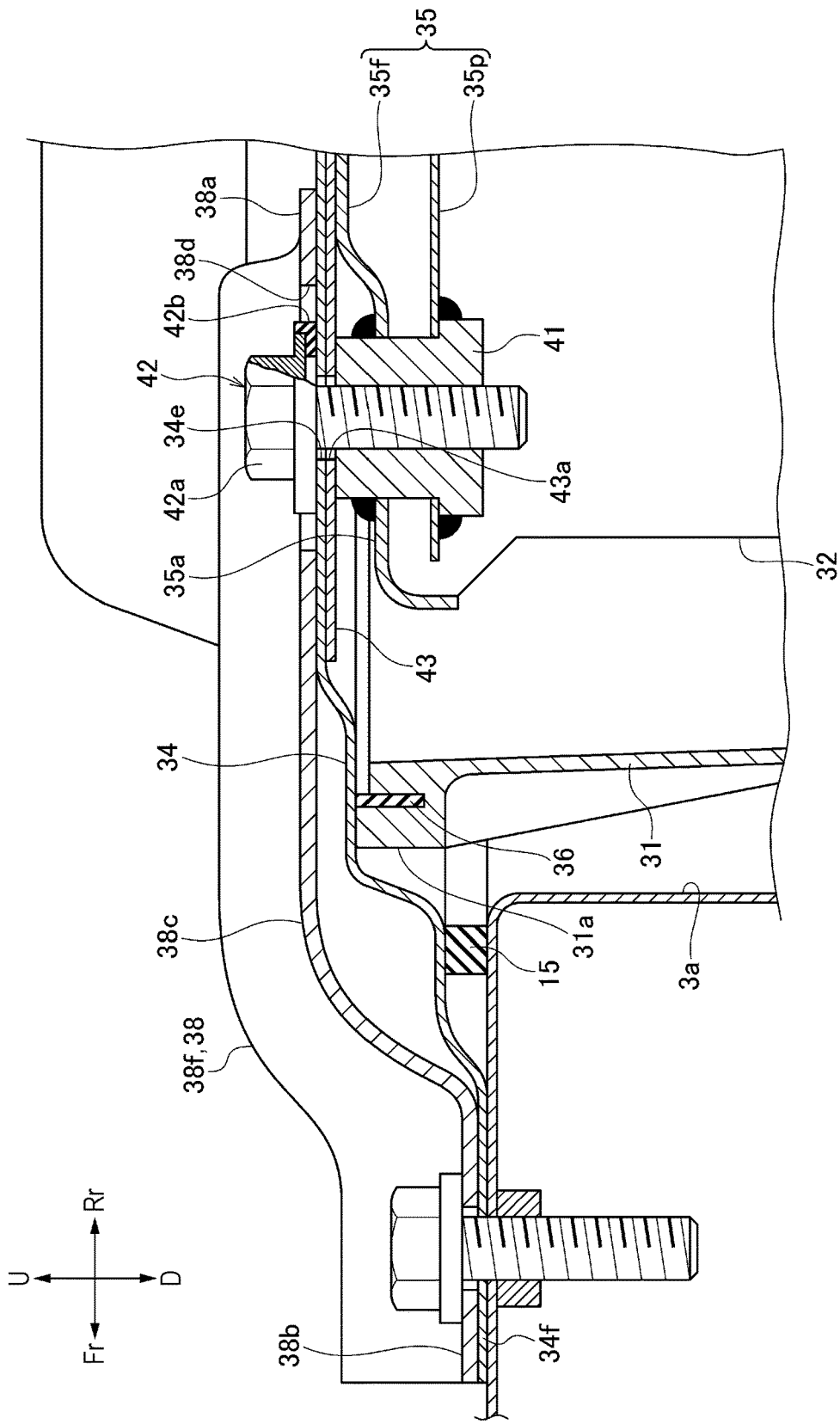
FIG. 4 is a sectional view taken along line IV-IV of FIG. 6.

Referring to FIG. 4, the battery cover 34 covers the upper opening of the battery case 31 in a sealed manner with a sealing member 36 provided between itself and a flange 31a of the battery case 31 to waterproof the battery unit 30. The battery cover 34 is fastened to the flange 31a of the battery case 31 at a position outside the sealing member 36a and is consequently secured to the battery case 31 without compromising waterproof functionality. In FIG. 4, reference number 15 refers to the sealing member that seals a gap between the battery case 31 and the floor panel 3.

The battery cover 34 is provided with two air inlets 34a, two air outlets 34b to which the exhaust duct 9 is connected, an ECU access hole 34c that enables access to the battery ECU 37 from outside the battery unit 30, and the plug access hole 34d that enables access to the inspection and servicing plug 33 from outside of the battery unit 30.

The ECU access hole 34c and the plug access hole 34d are normally individually covered with removable access covers 39, 40 (see FIG. 9), respectively, and can be opened by removing the access covers 39, 40, thereby enabling access to the battery ECU 37 and the inspection and servicing plug 33.

Figure 5:
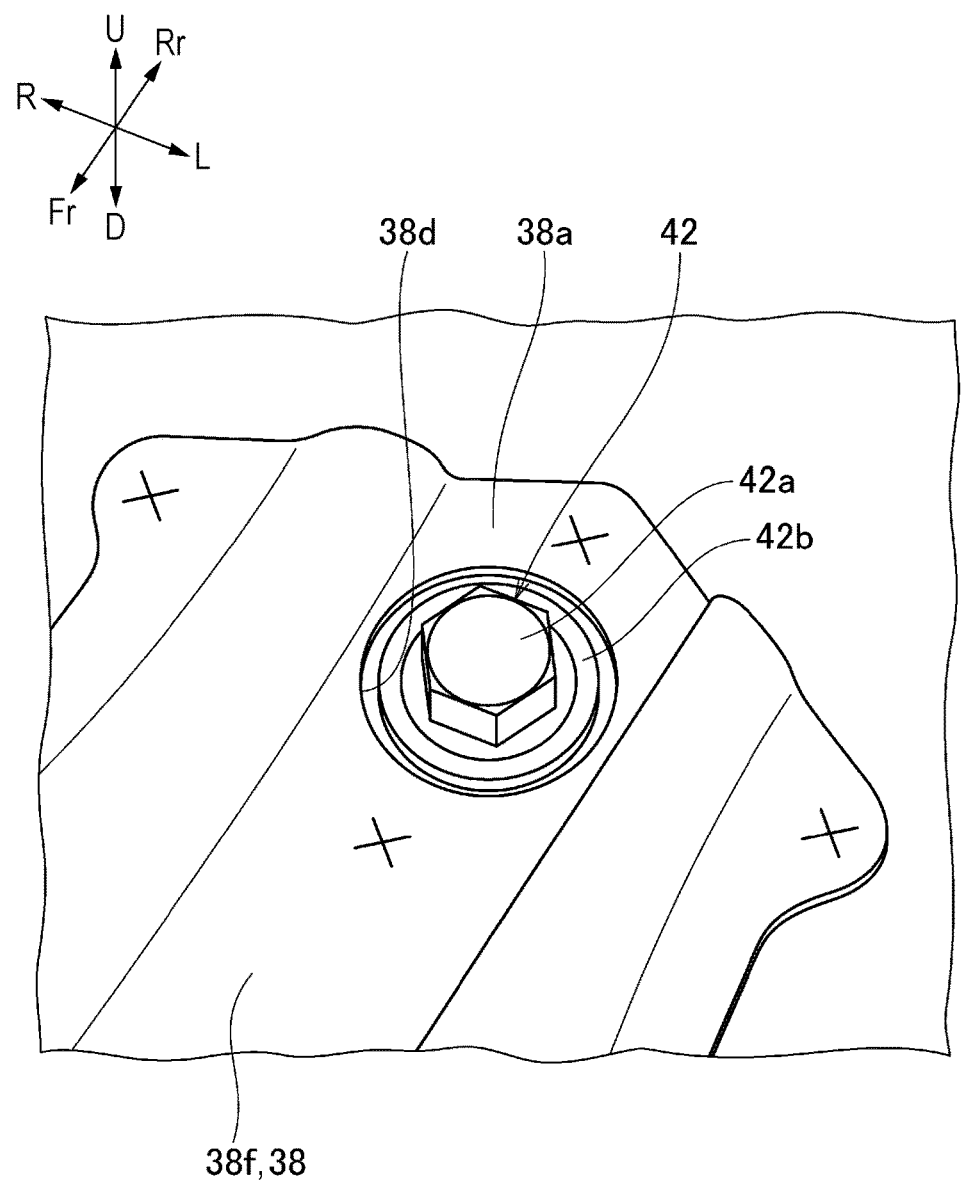
FIG. 5 is a perspective view showing a sealing bolt of a battery unit according to an embodiment of the present application.

In addition, the battery cover 34 has a holding function of holding and securing the battery modules 32 to the vehicle 1. A holding structure in which the battery cover 34 holds the battery modules 32 is described below with reference to FIGS. 4 and 5. FIGS. 4 and 5 illustrate the holding structure provided on the side of the cross frame 35f of the battery cover 34. Since the same holding structure is provided on the side of the cross frame 35r, descriptions about the holding structure on the side of the cross frame 35r are omitted.

As shown in FIG. 3, the upper frame member 35 has collar nuts 41 welded to four corner points (including one left and one right point of the cross frame 35f and one left and one right point of the cross frame 35r) thereof so as to pass through the cross frame 35f and the upper panel 35p, the former of which is located above the latter. As shown in FIG. 4, nut fastening portions 35a around the collar nuts 41 are located lower than other portions. The collar nuts 41 project from the cross frame 35f, thereby making their height substantially equal to other portions. In addition, the battery cover 34 has bolt insertion holes 34e formed at positions thereof that oppose the collar nuts 41.

Furthermore, reinforcing members 43 are provided between the battery cover 34 and the cross frame 35f, more specifically, between a lower surface of the battery cover 34 and upper surfaces of the collar nuts 41 so as to surround sealing bolts 42 that are inserted into the bolt insertion holes 34e. The reinforcing members 43 are plate-like members having the bolt insertion holes 34e and reinforce the battery cover 34 from the back side around the sear bolts 42.

Bolts 42a are inserted into the bolt insertion holes 34e from above the battery cover 34. The bolts 42a are seated in the upper surface of the battery cover 34 and at the same time are screwed into the collar nuts 41, whereby the upper frame member 35 is secured to the battery cover 34. This ensures that the battery modules 32 are held by the battery cover 34 with the upper frame member 35, the collar nuts 41, the reinforcing members 43, and the bolts 42a therebetween.

The bolts 42a are the sealing bolts 42 provided at sitting portions thereof with sealing materials 42b that are used to seal gaps between sitting surfaces of the bolts 42a and the upper surface of the battery cover 34. When the battery modules 32 are held by the battery cover 34 with the bolts 42a therebetween, this arrangement prevents ingress of water into the gaps between the sitting surfaces of the bolts 42a and the upper surface of the battery cover 34 and also prevents the water from entering the inside of the battery unit 30 through the bolt insertion holes 34e of the battery cover 34. The sealing bolts 42 are not limited to sealing function equipped bolts pretreated with the sealing materials 42b and may include ordinary bolts combined with sealing function equipped washers and ordinary bolts combined with O-rings.

The battery cover 34 is provided in an integral manner with left and right front fixing members 38f welded to a front end thereof and left and right rear fixing members 38r welded to a rear end thereof and is secured to the front cross member 13 and the rear cross member 14 with these fixing members 38 therebetween.

Referring to FIG. 5, the fixing members 38 are provided with holding portion reinforcing regions 38a welded to the upper surface of the battery cover 34 so as to surround the seat bolts 42, fixing portion reinforcing regions 38b welded to upper surfaces of fixing portions 34f of the battery cover 34 fastened to the floor panel 3 together with the fixing members 38, and coupling regions 38c that couple the holding portion reinforcing regions 38a and the fixing portion reinforcing regions 38b to one another. "X" in FIG. 5 refers to a welding spot.

The holding portion reinforcing regions 38a have openings 38d through which the sealing bolts 42 are inserted. With this arrangement, the sealing bolts 42 are enabled to be directly seated in the battery cover 34, thereby providing waterproof functionality. In addition, the holding portion reinforcing regions 38a hold the battery cover 34 between themselves and the reinforcing members 43, thereby forming continuous load paths extending to the reinforcing members 43.

More specifically, holding the battery cover 34 between the holding portion reinforcing regions 38a of the front fixing members 38f and the reinforcing members 43 results in the creation of the load paths through the front fixing members 38f, the reinforcing members 43, and the upper frame member 35 on the side of the cross frame 35f, thereby eliminating the need to make the battery cover 34 from rigid materials. Likewise, this arrangement results in the creation of the load paths through the rear fixing members 38r, the reinforcing members 43, and the upper frame member 35 on the side of the cross frame 35r as well. Accordingly, the battery cover 34 has the longitudinal load paths formed from the front cross member 13 to the rear cross member 14, while providing the holding function and waterproof functionality, thereby eliminating the need to make the battery cover 34 from rigid materials.

Figure 6:
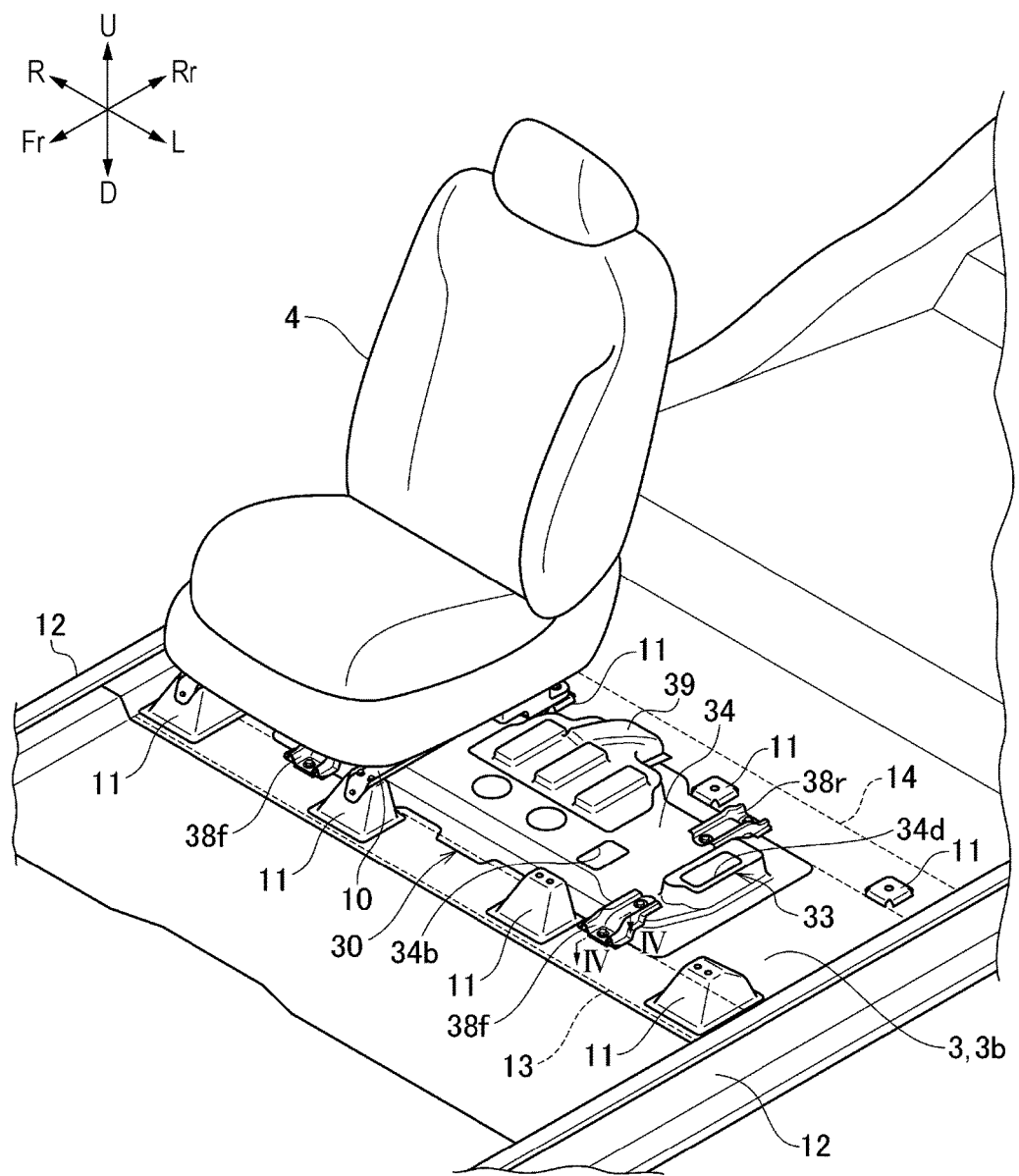
FIG. 6 is a perspective view, as seen from the front top, of a battery unit disposition area according to an embodiment of the present application, in which a left front seat is omitted.
Figure 7:
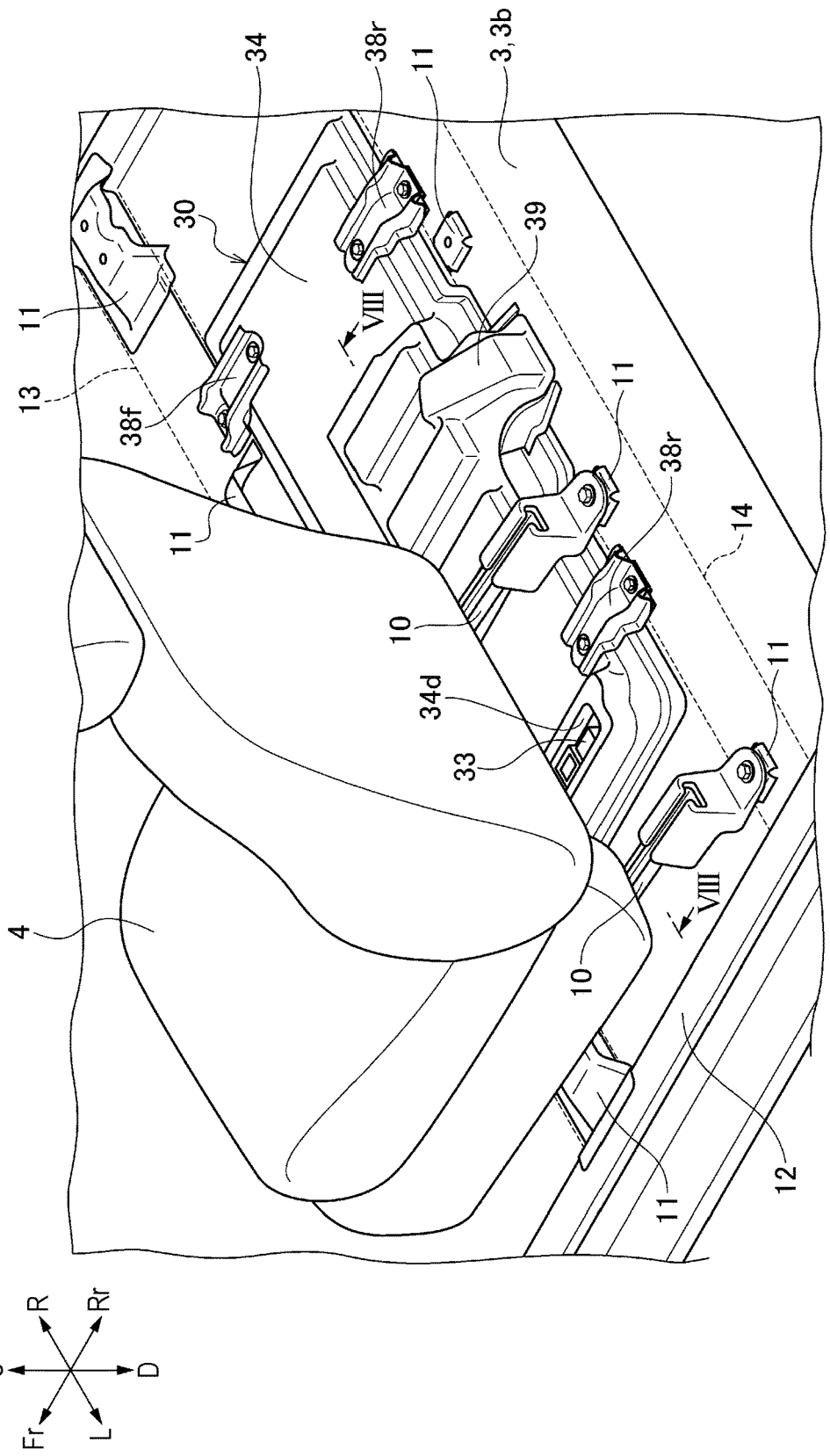
FIG. 7 is a perspective view, as seen from the rear top, of a battery unit disposition area according to an embodiment of the present application, in which a right front seat is omitted.
Figure 8:
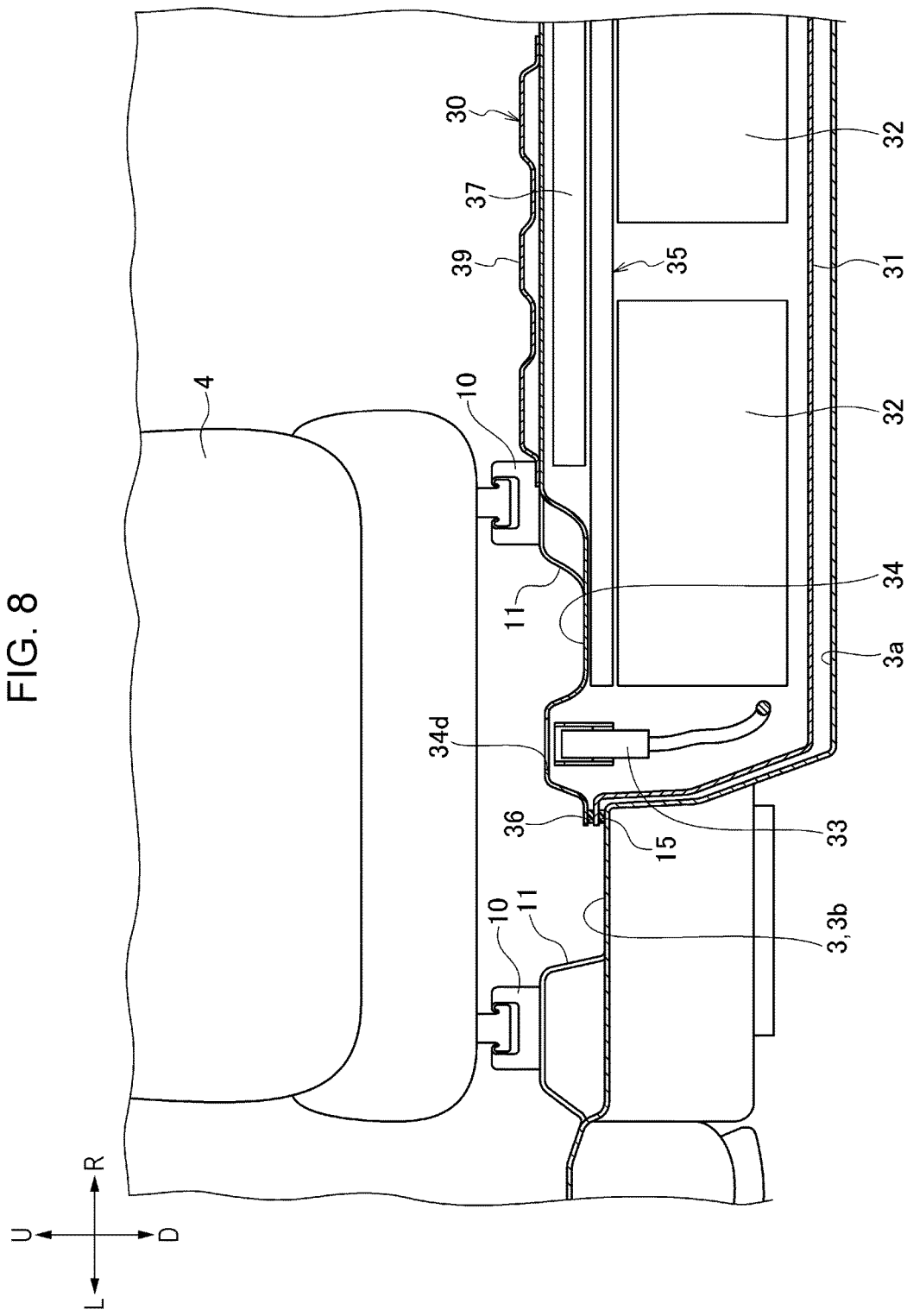
FIG. 8 is a sectional view taken along line VIII-VIII of FIG. 7.
Figure 9:
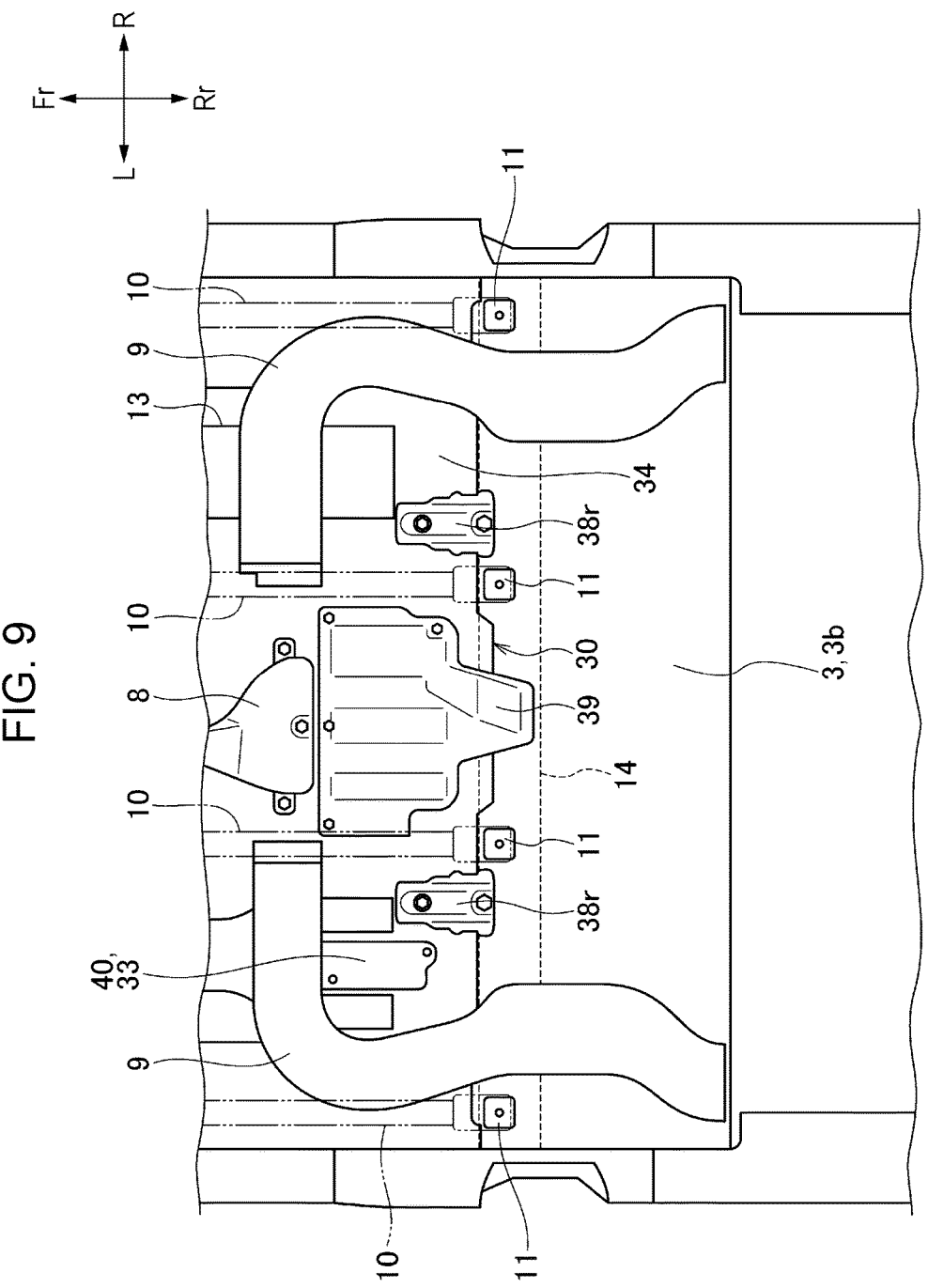
FIG. 9 is a plan view showing a battery unit disposition area according to an embodiment of the present application.

As shown in FIGS. 6 and 9, each of the left and right front seats 4 is provided at the base thereof with a pair of left and right seat rails 10 that support the front seats 4 so as to be longitudinally slidable and a pair of front and rear reinforcing components 11 that support front ends and rear ends of the seat rails 10. The seat rails 10 and the reinforcing components 11 are highly rigid enough to support the load of the front seats 4 and a driver, while the reinforcing components 11 are rigidly secured to the floor panel 3 by means of welding or the like. In addition, the seat rails 10 are held so as to be across a pair of the front and rear reinforcing components 11 projecting upward from the floor surface 3*b* of the floor panel 3. Even if the battery unit 30 is disposed under the front seats 4, this structure of the seat rails 10 enables the front seats 4 to be supported so as to be longitudinally slidable without any interference with the battery unit 30.

As described above, the battery unit 30 according to this embodiment enables the upper frame member 35 of the battery modules 32 to be secured to the battery cover 34 with the sealing bolts 42 seated in the battery cover 34, resulting in the battery modules 32 being held by the battery cover 34. Consequently, the battery modules 32 can be held by the battery cover 34 without compromising the waterproof functionality of the battery cover 34.

The fixing members 38 securing the battery unit 30 to the floor panel 3 are welded to the battery cover 34 so as to surround the sealing bolts 42. With this arrangement, the fixing members 38 reinforce a fastening portion between the battery cover 34 and the upper frame member 35, enabling the battery unit 30 to be secured from the front cross member 13 to the rear cross member 14. In addition, the fixing members 38 have the openings 38*d* through which the sealing bolts 42 are inserted, which does not cause the sealing bolts 42 to impair the waterproof functionality.

In addition, the reinforcing members 43 are provided between the battery cover 34 and the upper frame member 35 so as to surround the seat bolts 42. This arrangement enables the reinforcing members 43 to be provided only at the fastening portions necessary for the load paths, thereby avoiding an increase in weight while providing the holding function and the waterproof functionality.

In addition, the fixing members 38 are provided with the front fixing members 38*f* secured to the front cross member 13 and the rear fixing members 38*r* secured to the rear cross member 14. With this arrangement, the battery unit 30 can be firmly held by the front cross member 13 and the rear cross member 14.

Furthermore, the battery unit 30 is disposed in the battery storage recess 3*a* in the floor panel 3 so as to be located below the front seats 4. With this arrangement, even if the battery unit 30 is disposed on the floor panel 3, the passenger compartment space does not become smaller. In addition, even if the battery unit 30 is disposed under the front seats 4, the front seats 4 can be disposed at a lower position. Moreover, the load paths are formed of the front fixing members 38*f*, the upper frame member 35, the reinforcing members 43, and the rear fixing members 38*r* so as to extend from the front cross member 13 to the rear cross member 14. This arrangement eliminates the need to provide the battery cover 34 with a load-path function, contributing to a reduction in weight of the battery cover 34.

The present application is typically described with reference to, but not limited to, the foregoing embodiment. Various modifications or improvements are conceivable within the scope of the present application.

A first aspect of the present application provides a battery unit (for example, a battery unit 30 according to an embodiment to be described later) that includes a battery module (for example, battery modules 32 according to an embodiment to be described later), an upper frame member that holds the battery module in a suspended state (for example, an upper frame member 35 according to an embodiment to be described later), a battery case that contains the battery module held by the upper frame member (for example, a battery case 31 according to an embodiment to be described later), a battery cover that covers an upper opening of the battery case (for example, a battery cover 34 according to an embodiment to be described later), and a sealing member that seals a gap between the battery case and the battery cover (for example, a sealing member 36 according to an embodiment to be described later), in which the upper frame member is secured to the battery cover with a sealing bolt (for example, sealing bolts 42 according to an embodiment to be described later) seated in the battery cover and thereby the battery module is held by the battery cover. Consequently, the battery cover can hold the battery module without compromising waterproof functionality.

A second aspect of the present application provides the battery unit of the first aspect in which the battery unit is secured to a vehicle body frame (for example, a front cross member 13 and a rear cross member 14 according to an embodiment to be described later) with a fixing member (for example, fixing members 38 according to an embodiment to be described later) and in which the fixing member is welded to the battery cover so as to surround the sealing bolt and has a fixing member opening (for example, openings 38*d* according to an embodiment to be described later) through which the sealing bolt is inserted. With this arrangement, the fixing member reinforces a fastening portion between the battery cover and the upper frame member, enabling the battery unit to be secured to the vehicle body frame. In addition, the sealing bolt does not impair waterproof functionality.

A third aspect of the present application provides the battery unit of the second aspect in which a reinforcing member (for example, reinforcing members 43 according to an embodiment to be described later) is provided between the battery cover and the upper frame member so as to surround the sealing bolt. This arrangement enables the reinforcing member to be provided only at the fastening portion necessary for a load path, thereby avoiding an increase in weight, while providing a holding function and waterproof functionality.

A fourth aspect of the present application provides the vehicle of the third aspect in which the fixing member is provided with a front fixing member (for example, front fixing members 38*f* according to an embodiment to be described later) secured to a front cross member (for example, the front cross member 13 according to an embodiment to be described later) and a rear fixing member (for example, rear fixing members 38*r* according to an embodiment to be described later) secured to a rear cross member (for example, the rear cross member 14 according to an embodiment to be described later). This arrangement enables the battery unit to be firmly held by the front cross member and the rear cross member.

A fifth aspect of the present application provides a vehicle (for example, a vehicle 1 according to an embodiment to be described later) that includes a floor panel (for example, a floor panel 3 according to an embodiment to be described later), a seat (for example, front seats 4 according to an embodiment to be described later) disposed on the floor panel, and the battery unit of the fourth aspect, in which the battery unit is disposed in a battery storage recess (for example, a battery storage recess 3a according to an embodiment to be described later) surrounded by a pair of left and right side frames (for example, side frames 12 according to an embodiment to be described later) and a pair of front and rear cross members (for example, the front cross member 13 and the rear cross member 14 according to an embodiment to be described later), in which the battery storage recess is recessed from the floor panel so as to be located below the front seat, and in which a load path is formed of the front fixing member, the upper frame member, the reinforcing member, and the rear fixing member so as to extend from the front cross member to the rear cross member. With this arrangement, even if the battery unit is disposed on the floor panel, the passenger compartment space is not decreased. In addition, even if the battery unit is disposed under the front seat, the front seat can be disposed at a lower position. Moreover, the load path is formed of the front fixing member, the upper frame member, the reinforcing member, and the rear fixing member so as to extend from the front cross member to the rear cross member. This arrangement eliminates the need to provide the battery cover with a load-path function, contributing to a reduction in weight of the battery cover.

Obviously, numerous modifications and variations of the present invention are possible in light of the above teachings. It is therefore to be understood that within the scope of the appended claims, the invention may be practiced otherwise than as specifically described herein.

What is claimed is:

1. A battery unit comprising:
a battery module;
an upper frame member that holds the battery module in a suspended state;
a battery case that contains the battery module held by the upper frame member;
a battery cover that covers an upper opening of the battery case; and
a sealing member that seals a gap between the battery case and the battery cover,
wherein the upper frame member is secured to the battery cover with a sealing bolt seated in the battery cover and thereby the battery module is held by the battery cover,
wherein the battery unit is secured to a vehicle body frame with a fixing member; and
wherein the fixing member is welded to the battery cover so as to surround the sealing bolt and has a fixing member opening through which the sealing bolt is inserted.

2. The battery unit according to claim 1,
wherein a reinforcing member is provided between the battery cover and the upper frame member so as to surround the sealing bolt.

3. The battery unit according to claim 2,
wherein the fixing member is provided with a front fixing member secured to a front cross member and a rear fixing member secured to a rear cross member.

4. A vehicle comprising:
a floor panel;
a seat disposed on the floor panel; and
the battery unit according to claim 3,
wherein the battery unit is disposed in a battery storage recess surrounded by a pair of left and right side frames and a pair of front and rear cross members;
wherein the battery storage recess is recessed from the floor panel so as to be located below the seat; and
wherein a load path is formed of the front fixing member, the upper frame member, the reinforcing member, and the rear fixing member so as to extend from the front cross member to the rear cross member.

5. A battery unit comprising:
a battery module;
an upper frame member from which the battery module is suspended;
a battery case having an opening to accommodate the battery module in the battery case;
a battery cover to cover the opening of the battery case;
a sealing member to seal a gap between the battery case and the battery cover; and
a sealing bolt provided on the battery cover and secured to the upper frame member to connect the battery module and the battery cover via the upper frame member,
wherein the battery unit is secured to a vehicle body frame with a fixing member; and
wherein the fixing member is welded to the battery cover to surround the sealing bolt and has a fixing member opening through which the sealing bolt is inserted.

6. The battery unit according to claim 5,
wherein a reinforcing member is provided between the battery cover and the upper frame member to surround the sealing bolt.

7. The battery unit according to claim 6,
wherein the fixing member is provided with a front fixing member secured to a front cross member and a rear fixing member secured to a rear cross member.

8. A vehicle comprising:
a floor panel having a battery storage recess surrounded by a front cross member, a rear cross member, a left side frame and a right side frame, the rear cross member being opposite to the front cross member with respect to the battery storage recess;
a seat disposed on the floor panel to be located above the battery storage recess; and
the battery unit according to claim 7, the battery unit being disposed in the battery storage recess such that the front fixing member, the upper frame member, the reinforcing member, and the rear fixing member provide a load path to extend from the front cross member to the rear cross member.

* * * * *